(12) United States Patent
Anderson et al.

(10) Patent No.: US 10,937,258 B2
(45) Date of Patent: Mar. 2, 2021

(54) WORK VEHICLE MAINTENANCE MANAGEMENT SYSTEMS AND METHODS

(71) Applicant: Deere & Company, Moline, IL (US)

(72) Inventors: Graham S. Anderson, Cedar Falls, IA (US); Amy Hou, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 176 days.

(21) Appl. No.: 16/153,083

(22) Filed: Oct. 5, 2018

(65) Prior Publication Data

US 2020/0111271 A1  Apr. 9, 2020

(51) Int. Cl.
| | | |
|---|---|---|
| *G07C 5/08* | (2006.01) |
| *F01N 11/00* | (2006.01) |
| *F01N 3/20* | (2006.01) |
| *F01N 3/035* | (2006.01) |

(52) U.S. Cl.
CPC ............ *G07C 5/085* (2013.01); *F01N 3/035* (2013.01); *F01N 3/2066* (2013.01); *F01N 11/00* (2013.01); *G07C 5/0808* (2013.01); *G07C 5/0816* (2013.01); *F01N 2900/0416* (2013.01)

(58) Field of Classification Search
CPC .. G07C 5/0851; G07C 5/0808; G07C 5/0816; F01N 3/2066; F01N 3/035; F01N 11/00; F01N 2900/0416; F01N 2560/026; F01N 2900/1402; F01N 2590/08; F01N 2550/00
See application file for complete search history.

(56) References Cited

U.S. PATENT DOCUMENTS

| | | | |
|---|---|---|---|
| 5,442,553 A | 8/1995 | Parrillo | |
| 7,042,346 B2 | 5/2006 | Paulsen | |
| 2004/0233045 A1 | 11/2004 | Mays | |
| 2008/0154691 A1 | 6/2008 | Wellman et al. | |
| 2008/0228346 A1 | 9/2008 | Lucas | |
| 2010/0106327 A1 | 4/2010 | Grohman et al. | |
| 2012/0210697 A1* | 8/2012 | Garimella | F01N 13/009 60/274 |

(Continued)

FOREIGN PATENT DOCUMENTS

| | | |
|---|---|---|
| FR | 2846116 A1 | 12/2004 |
| JP | 2006256457 A | 9/2006 |
| WO | 2013074901 A2 | 5/2013 |

*Primary Examiner* — Anne Marie Antonucci
(74) *Attorney, Agent, or Firm* — Klintworth & Rozenblat IP LLP

(57) ABSTRACT

A power system for a work vehicle includes an engine that generates exhaust gas, an exhaust treatment system that treats the exhaust gas, and an electronic control system coupled to the engine and the exhaust treatment system and implementing a maintenance management system. The maintenance management system is configured to receive a first identifier associated with a first sensor or actuator device installed in the exhaust treatment system, store the first identifier in memory, receive a second identifier associated with a second sensor or actuator device installed in the power system of the work vehicle, compare the first identifier to the second identifier to determine that the first identifier differs from the second identifier and that the second sensor or actuator device is a replacement for the first sensor or actuator device in the exhaust treatment system, and clear any fault codes associated with the first sensor or actuator device.

20 Claims, 4 Drawing Sheets

(56) References Cited

U.S. PATENT DOCUMENTS

| | | |
|---|---|---|
| 2013/0151065 A1 | 6/2013 | Ricci |
| 2013/0204484 A1 | 8/2013 | Ricci |
| 2015/0015389 A1* | 1/2015 | McIntyre ............ B60C 23/0408 |
| | | 340/447 |
| 2015/0184609 A1* | 7/2015 | Yoon .................... F02D 41/222 |
| | | 73/1.06 |
| 2017/0091634 A1* | 3/2017 | Ritter ....................... G07C 3/00 |

* cited by examiner

WORK VEHICLE MAINTENANCE MANAGEMENT SYSTEMS AND METHODS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to maintenance management systems and methods for work vehicles.

BACKGROUND OF THE DISCLOSURE

A work vehicle, such as a construction vehicle, an agricultural vehicle, or a forestry vehicle, typically includes a power system with an internal combustion engine. The engine may be in the form of a compression ignition engine (i.e., diesel engine) or a spark ignition engine (i.e., gasoline engine). For most heavy work vehicles, diesel engines provide better lugging, pull-down and torque characteristics for associated work operations. In order to address emissions issues with combustion engines, power systems typically include an exhaust treatment system to reduce levels of particulate and nitrogen oxides (NOx) in the engine exhaust. In order to effectively operate such power systems, as well as regulatory compliance, the work vehicle may include a number of sensor or actuator devices, including one or more associated with the exhaust treatment systems. However, efficient and effective maintenance and/or management of these devices may be challenging.

SUMMARY OF THE DISCLOSURE

The disclosure provides a maintenance management system and method for a work vehicle.

In one aspect, the disclosure provides a power system for a work vehicle. The power system includes an engine that generates exhaust gas, an exhaust treatment system that receives and treats the exhaust gas prior to expelling the treated exhaust gas and an electronic control system coupled to the engine and the exhaust treatment system and implementing a maintenance management system. The maintenance management system is configured to: receive a first identifier associated with a first sensor or actuator device installed in the exhaust treatment system; store the first identifier associated with the first sensor or actuator device; receive a second identifier associated with a second sensor or actuator device installed in the power system of the work vehicle; compare the first identifier to the second identifier to determine that the first identifier differs from the second identifier and that the second sensor or actuator device is a replacement for the first sensor or actuator device in the exhaust treatment system; and clear any fault codes associated with the first sensor or actuator device.

In another aspect, the disclosure provides a method for managing maintenance for a power system in a work vehicle with an engine and an exhaust treatment system. The method includes receiving a first identifier associated with a first sensor or actuator device installed in the power system of the work vehicle; storing the first identifier associated with the first sensor or actuator device; receiving a second identifier associated with a second sensor or actuator device installed in the power system of the work vehicle; comparing the first identifier to the second identifier to determine that the first identifier differs from the second identifier and that the second sensor or actuator device is a replacement for the first sensor or actuator device in the power system of the work vehicle; and clearing any fault code associated with the first sensor or actuator device.

In a further aspect, the disclosure provides a maintenance management system implemented in an electronic control system of a work vehicle with a power system having an engine and an exhaust treatment system. The maintenance management system includes a processor; and a computer-readable storage medium storing a computer-executable code that, when executed by the processor, causes the maintenance management system to perform the operations of: receiving a first identifier associated with a first sensor installed in the exhaust treatment system; storing the first identifier associated with the first sensor; monitoring signals from the first sensor for a first fault associated with the first sensor; generating, upon identifying the first fault based on the monitored signals, a first fault code associated with the first sensor; providing, upon generating the first fault code, a message for an operator identifying the first fault code; imposing, upon generating the first fault code, a first inducement on the power system based on first fault code; receiving a second identifier associated with a second sensor installed in the exhaust treatment system; comparing the first identifier to the second identifier to determine that the first identifier differs from the second identifier and that the second sensor or actuator device is a replacement for the first sensor in the exhaust treatment system; and clearing the first fault code and the first inducement associated with the first sensor.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed maintenance management system and method, as shown in the accompanying figures of the drawings described briefly above. Various modifications to the example embodiments may be contemplated by one of skill in the art.

As noted, work vehicles may include power systems with diesel engines to produce torque in a wide range of applications, including long-haul trucks, tractors, agricultural or construction vehicles, surface mining equipment, non-electric locomotives, stationary power generators and the like. During the combustion process, diesel engines may generate particulates, nitrogen oxides (NOx), and other types of pollutants that are subject to increasingly strict emissions standards. As such, engine and equipment manufacturers have developed systems for reducing the levels of pollutants released into the environment. For example, some work vehicles utilize an exhaust treatment system to reduce NOx emissions from diesel engine exhaust gas. Regulatory and industry standards also have maintenance and compliance requirements for various sensors and actuator devices. As an example, the malfunctioning of certain types of sensors and actuator devices require inducements on the power system until the faulty device is replaced. Conventionally, maintenance of such sensor or actuator devices may have issues with respect to complexity, efficiency, and productivity.

The following describes one or more example implementations of the disclosed systems and methods for managing the maintenance of actuator and sensor devices in power systems, particularly in exhaust treatment systems. Examples achieve this improvement by enabling an electronic control system to communicate with sensor or actuator devices to confirm the identifiers linked to the devices such that the associated faults may be automatically cleared upon replacement. Discussion herein may sometimes focus on the example context of NOx sensors in an exhaust treatment system of a tractor, but the exhaust treatment system is applicable to other types of sensors and actuator devices, other types of engine systems, and/or other types of work vehicles.

Figure 1:
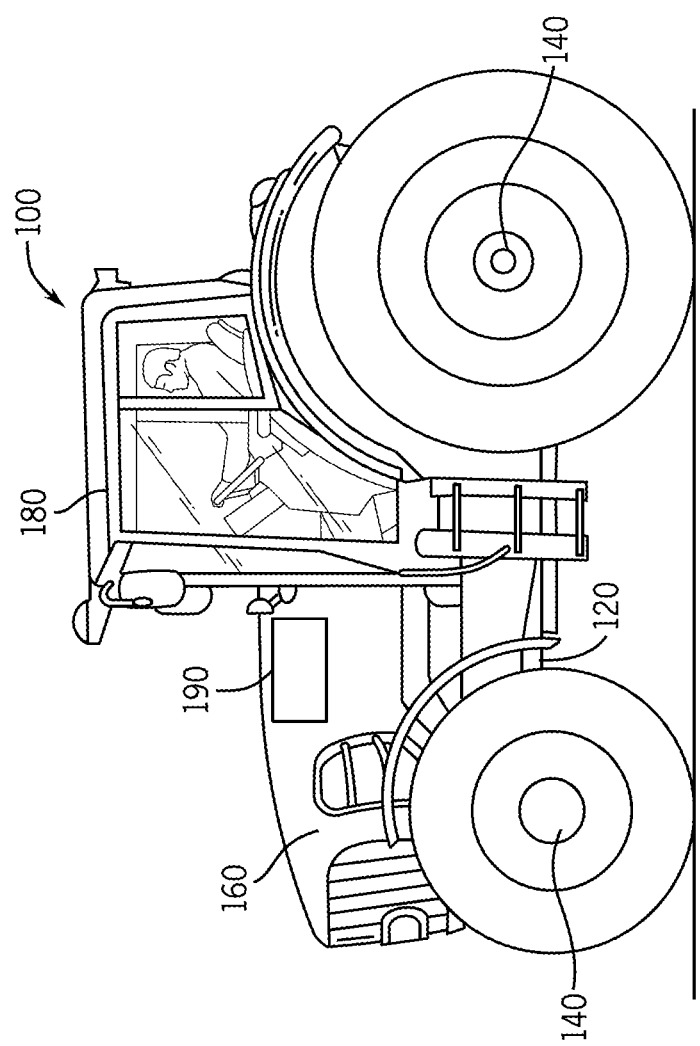
FIG. 1 is a side view of an example work vehicle in the form of a tractor in which a maintenance management system and method may be used in accordance with this disclosure.

Referring to FIG. 1, in some embodiments, the disclosed maintenance management systems and methods may be used with a work vehicle 100. In the example of FIG. 1, the work vehicle 100 is a tractor, although as indicated above, the description herein is applicable to any type of vehicle. As shown, the work vehicle 100 may be considered to include a main frame or chassis 120, a drive assembly 140, a power system 160, an operator platform or cabin 180, and an electronic control system 190. As is typical, the power system 160 includes an internal combustion engine mounted on the chassis 120 used for propulsion of the work vehicle 100 via the drive assembly 140 based on commands from an operator in the cabin 180. During operation, the internal combustion engine of the power system 160 generates exhaust gas. As such, the power system 160 further includes an exhaust treatment system that functions to reduce pollutants prior to emission of the engine exhaust gas into the atmosphere. The electronic control system 190 generally functions to control and/or facilitate operation of various aspects of the work vehicle 100. As described below, the electronic control system 190 may include any necessary processing, memory, communication, and/or interface components for implementing the functions described herein. Among other functions, the electronic control system 190 implements a maintenance management system for the monitoring sensor and/or actuator devices; the replacement of faulty sensor and/or actuator devices; and the resumption of operation subsequent to replacement of sensor and/or actuator devices. Additional details about the maintenance management system with respect to the power system 160 and the electronic control system 190 will be provided with reference to FIGS. 2-4.

Figure 2:
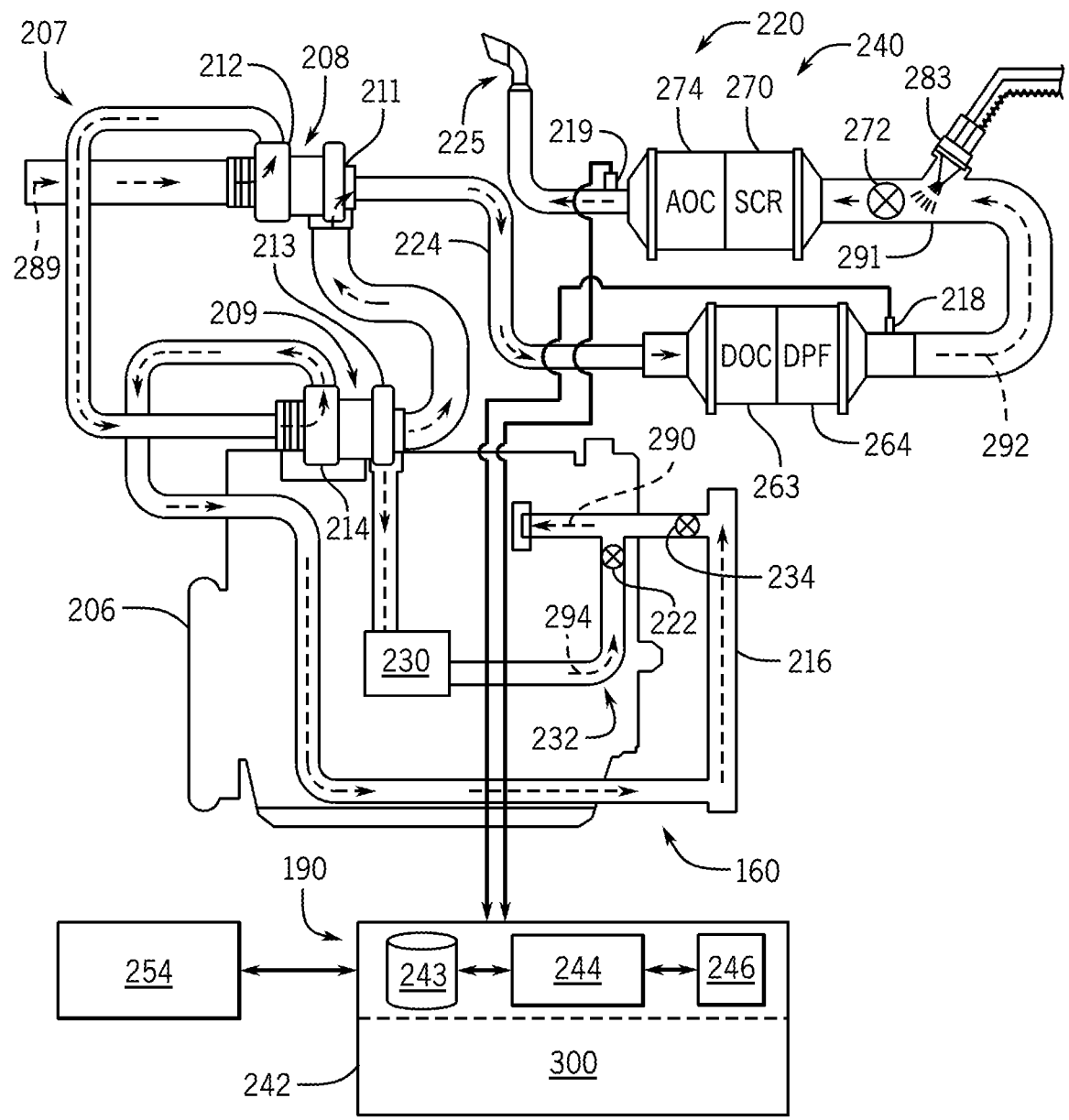
FIG. 2 is a schematic diagram of a power system and an electronic control system for implementing a maintenance management system in accordance with an example embodiment.

Referring to FIG. 2, there is shown a schematic illustration of the power system 160 operatively coupled to the electronic control system 190 that implements a maintenance management system 300. Although discussed in the context of a tractor, the power system 160 may operate to provide power to various types of machines, including on-highway trucks, construction vehicles, marine vessels, stationary generators, automobiles, agricultural vehicles, and recreational vehicles.

As introduced above, the power system 160 includes an internal combustion engine 200 that generates exhaust gas while producing torque. Accordingly, the power system 160 further includes an exhaust treatment system (or aftertreatment system) 210 for reducing harmful emissions within the exhaust gas. Generally, the engine 200 may be any kind of internal combustion engine, such as a gasoline engine, a diesel engine, a gaseous fuel burning engine (e.g., natural gas), or any other exhaust producing engine. As an example, the engine 200 described below is a diesel engine. The engine 200 may be of any size, with any number cylinders, and in any configuration. The engine 200 may include other features not shown, such as, fuel systems, air systems, cooling systems, peripheries, drivetrain components, etc. The engine 200 may further include various sensors, such as emissions sensors, temperature sensors, pressure sensors, and mass flow sensors.

The schematic view of FIG. 2 particularly depicts portions of the air flow through the power system 160. In this example, air enters the power system 160 through an intake section 207 and is directed through first and second turbochargers 208, 209. The first turbocharger 208 is formed by a compressor 212 driven by a turbine 211 through a shaft (not shown), and similarly, the second turbocharger 209 is formed by a compressor 214 driven by a turbine 213 through a shaft (not shown). The air from the intake section 207 is compressed by the compressor 212 of the first turbocharger 208, and subsequently, the compressed air is directed through the compressor 214 of the second turbocharger 209 to further increase the pressure.

The compressors 212, 214 of the turbochargers 208, 209 may be fixed geometry compressors, variable geometry compressors, or any other types of compressor that are capable of receiving and compressing the intake gas to an elevated pressure level prior to combustion. The compressed air from the turbochargers 208, 209 is then cooled in a charge air cooler 216. The charge air cooler 216 may be an air-to-air cooler that includes or cooperates with a radiator.

An air throttle actuator 234 is positioned downstream of the charge air cooler 216. The air throttle actuator 234 operates to control intake air flow from the turbochargers 208, 209 into the cylinders of the engine 206, as indicated by arrow 290. Within the cylinders of the engine 206, the air is ignited and combusted to generate exhaust gas that is distributed by an exhaust manifold.

A first portion of the exhaust gas flows through an exhaust gas recirculation (EGR) system 232. As shown, the exhaust gas is initially cooled by a cooler 230 prior to being mixed with the fresh intake air flow and directed back into the engine 206, as indicated by arrow 294. An EGR valve 222 may be positioned upstream of the fresh intake air flow such that a specific amount of recirculated exhaust gas is directed back into the engine 206.

A second, un-recirculated portion of the exhaust gas is directed through the turbine 213 of the second turbocharger 209 and then through the turbine 211 of the first turbocharger 208. As noted above, the flows of exhaust gas through the turbines 213, 211 function to drive the respective compressors 214, 212. The exhaust gas is then directed into the exhaust treatment system 220.

The exhaust treatment system 220 is oriented downstream of the engine 200 to receive the exhaust gas. Generally, the exhaust treatment system 220 operates to remove various chemical compounds and particulate emissions present in the exhaust gas received from the engine 206. In one example, the exhaust treatment system 220 includes an inlet tube 224, a diesel oxidation catalyst (DOC) 263, a diesel particulate filter (DPF) 264, a selective catalytic reduction (SCR) system 240, and an outlet tube 225, although the need for such components depends on the particular size and application of the power system 160. During operation, the exhaust gas may enter through the inlet tube 224; flow through the DOC 263, the DPF 264, and the SCR system 240; and be expelled into the atmosphere via the outlet tube 225, which may be the tailpipe of the vehicle 100 (FIG. 1).

The DOC 263 may be configured in a variety of ways and generally contains catalyst materials useful in collecting, absorbing, adsorbing, and/or converting hydrocarbons, carbon monoxide, and/or nitrogen oxides (NOx) contained in the exhaust gas. Such catalyst materials may include, for example, aluminum, platinum, palladium, rhodium, barium, cerium, and/or alkali metals, alkaline-earth metals, rare-earth metals, or combinations thereof incorporated with a substrate such as, for example, a ceramic substrate, a metallic mesh, foam, or any other porous material known in the art. The DOC 263 may also oxidize nitrogen oxide (NO) contained in the exhaust gas for conversion into nitrogen dioxide ($NO_2$) upstream of the SCR system 240. The DPF 264 is downstream of the DOC 263 and configured to remove particulate matter from the exhaust gas. The DPF 264 may be any of various particulate filters known in the art configured to reduce particulate matter concentrations, such as soot and ash. As shown, the DOC 263 and the DPF 264 may be positioned within the same housing, but in other implementations, they may be separate from one another. In some examples, the DOC 263 and/or DPF 264 may be omitted.

Generally, the SCR system 240 functions to further reduce the amount of NOx in the exhaust flow. In one example, the SCR system 240 includes a decomposition tube 291, a reductant delivery mechanism 283, an SCR catalyst device 270, and an ammonia oxidation catalyst (AOC) 274. As partially shown, the reductant delivery mechanism 283 may be controllable to selectively inject an amount of reductant into the flow of exhaust gas within the decomposition tube 250. In one example, the reductant is diesel emissions fluid (DEF) that is a solution of urea and deionized water, such as 32.5% high purity urea and 67.5% deionized water, although other reductant solutions may be used. Although not shown, the reductant delivery mechanism 283 may include, as examples, any suitable tanks, conduits, valves, orifices, sensors, pumps, heating and/or cooling elements, control elements, actuators, and/or other components to facilitate delivery of the reductant to the decomposition tube 250. The decomposition tube 291 receives and facilitates the mixing of the reductant and the exhaust gas to produce ammonia upstream of the SCR catalyst device 270.

The SCR catalyst device 270 may include any of various catalysts known in the art disposed on a substrate. In the SCR catalyst device 270, the ammonia reacts with NOx for reduction into less harmful emissions, such as diatomic nitrogen ($N_2$) and water ($H_2O$). As examples, the SCR catalyst device 270 may include a vanadium-based catalyst or mixed metal oxides, or the SCR catalyst device 270 may include a zeolite-based catalyst, such as a Cu-zeolite or a Fe-zeolite. Downstream of the SCR catalyst device 270, the AOC 274 includes additional catalysts that further react with ammonia to produce less harmful emissions. After treatment, the exhaust gas is vented into the atmosphere through the outlet tube 225. As shown, the AOC 274 and the SCR catalyst device 270 may be positioned within the same housing, but in other implementations, they may be separate from one another. In some examples, the AOC 274 and/or the SCR catalyst device 270 may be omitted.

The exhaust treatment system 220 may include any suitable actuators, sensors, control elements, heating and/or cooling elements, and the like that facilitate operation. As examples, the exhaust treatment system 220 may include NOx sensors 218, 219 that operate to detect a parameter indicative of a NOx content of the exhaust gas. The NOx sensors 218, 219 may, for example, rely upon an electrochemical or catalytic reaction that generates a current, the magnitude of which is indicative of the NOx concentration of the exhaust gas. In the depicted example, the NOx sensors 218, 219 are positioned immediately downstream of the DOC 263 and DPF 264 and immediately downstream of the SCR catalyst device 270 and AOC 274, although other sensors and/or positions may be provided. Although not shown, temperature sensors may further be arranged on either side of the DOC 263 and DPF 264 and on either side of the SCR catalyst device 270 and AOC 274. Further, pressure sensors may be provided in any suitable location, such as on either side of the DPF 264.

In one example, and as discussed in greater detail below, the sensors and actuator devices of the power system 160, including the NOx sensors 218, 219, may be "smart" sensor or actuator devices. Generally, a smart sensor or actuator device is a device that receives input from the physical environment or via a communications interface; uses built-in processing and memory resources to perform predefined functions; and generates an appropriate response. Additional details about the sensors are provided below, particularly the interaction of sensors 218, 219 with the maintenance management system 300.

As introduced above, the electronic control system 190 may be part of, or otherwise cooperate with, the power system 160 to facilitate operation. In one example, the electronic control system 190 includes an electronic control unit (ECU) 242 with a processor 244, a memory 243, and an interface 246 for implementing the functions described herein. As described in greater detail below, the ECU 242 may operate implement the maintenance management system 300.

The processor 244 may be implemented using, for example, a microprocessor or other suitable processor. The memory 243 may be implemented using any suitable computer-readable media, and may include RAM and/or ROM. The memory 243 may be any suitable computer-readable storage medium that stores code or software, such as algorithms and/or data, for configuring the processor 244 upon execution to perform one or more functions of the ECU 242, particularly those of the maintenance management system 300. The ECU 242 may also include an interface 246 for selectively communicating with various systems of the work vehicle 100, as well as remote systems. The interface 246 may be implemented using any appropriate wired or wireless data interface technology. As one example, the interface 246 may be implemented to communicate with a Controller Area Network (CAN bus) of the work vehicle 100 (FIG. 1). In some examples, the processor 244, memory 243, and interface 246 may be functionally configured as discrete electronic circuits.

The electronic control system 190 may also include one or more operator (or human-machine) interfaces 254 to enable operator interaction with the vehicle 100, particularly the ECU 242. In one example, one or more aspects of the operator interface 254 may be provided within the cabin 180 (FIG. 1) and configured in a variety of ways. In some embodiments, the operator interface 254 may be one or more interface devices that support operator input and/or output of information to and from the ECU 242, such as one or more joysticks, various switches or levers, one or more buttons, control panel, a touchscreen interface or cursor control device that operates with a display, a keyboard, an audible device, a microphone associated with a speech recognition system, or the like. Among other functions, and as described in greater detail below, the operator interface 254 may operate to communicate faults and other issues with the power system 160 based on signals generated by the maintenance management system 300.

Among other functions, the ECU 242 may function to control operation of the exhaust treatment system 220. For example, the ECU 242 may receive signals from the operator via the interface 254 or from other systems to activate various aspects of the exhaust treatment system 220 as appropriate. Further, during operation, the ECU 242 may receive signals from various sensors representing system parameters, evaluate the parameter, and generate command signals in response for the engine 206 and/or the exhaust treatment system 220, such as activating valves 222, 234 and/or modifying operation of the engine 206. The ECU 242 may further display the parameters and/or other operating information to the operator via the interface 254. In some examples, the ECU 242 may perform diagnostic or health monitoring functions with respect to various power system components, such as confirming that certain components are active or that parameters are within appropriate ranges. As described below, some of these functions may be implemented by the maintenance management system 300.

As noted above, the maintenance management system 300 may be implemented by the ECU 242 to perform various functions associated with the power system 160, particularly the exhaust treatment system 220. Typically, the emissions from the work vehicle 100 are subject to industry and/or government regulations as compliance requirements. As a result, the exhaust treatment system 220 may be subject to certain conditions that must be monitored and addressed. For example, upon identification of a fault associated with particular sensors, compliance regulations may require an inducement upon the power system 160 that results in a reduction in available power until the fault is addressed. As described in greater detail below, the maintenance management system 300 operates to monitor the health of one or more sensor and/or actuator devices, particularly the NOx sensors 218, 219; implement compliance requirements upon detecting a fault with the sensor and/or actuator devices; and facilitate replacement and resumption of operation upon replacement of the sensor and/or actuator devices.

Figure 3:
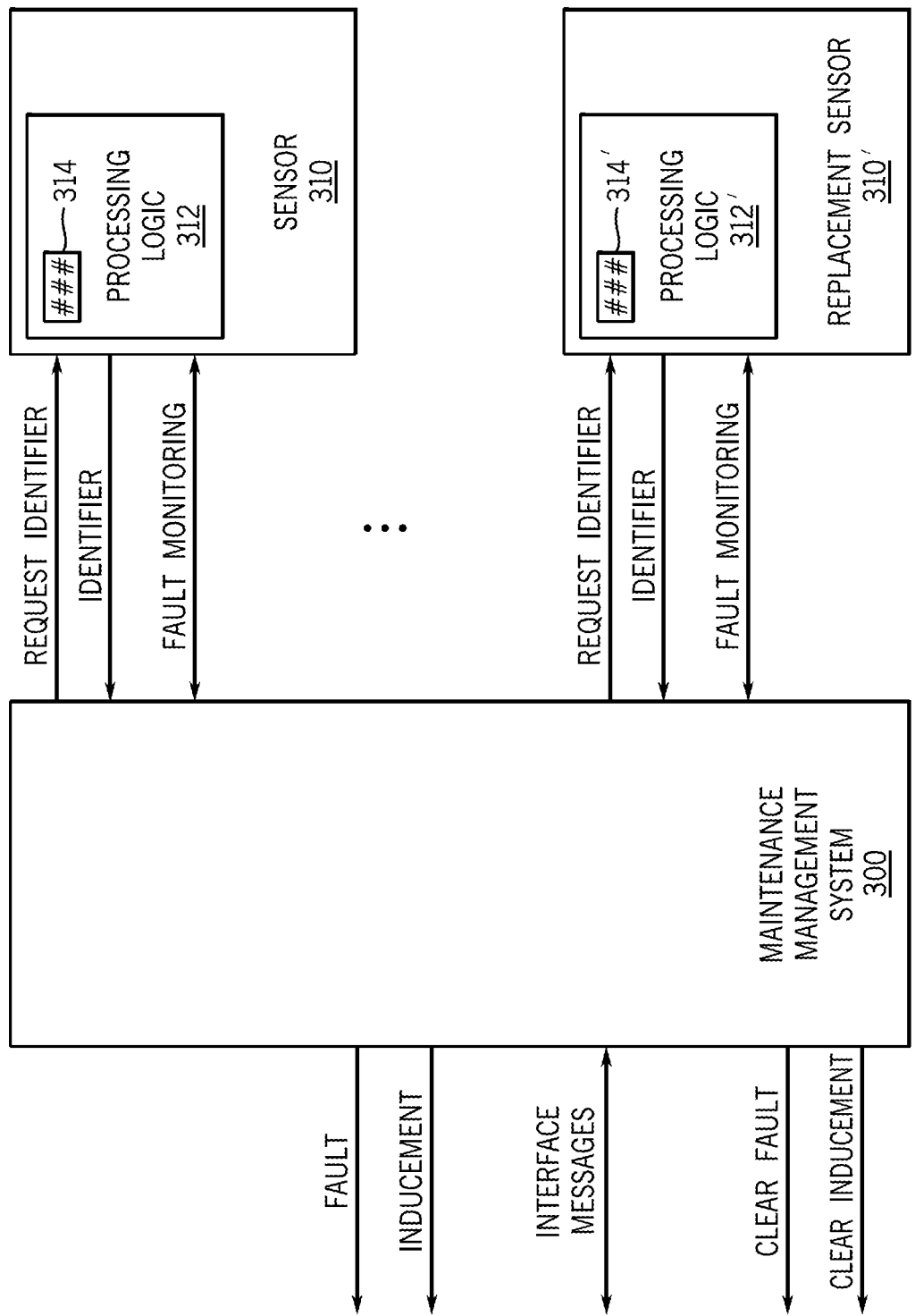
FIG. 3 is a schematic block diagram with data flows depicting operation of the maintenance management system in accordance with an example embodiment.

Reference is now made to FIG. 3, which is a schematic block diagram with data flows depicting operation of the maintenance management system 300. In this example, the maintenance management system 300 interacts with sensors or actuators 310, 310' alternatively or subsequently, such as when sensor 310' replaces sensor 310. The sensors or actuators 310, 310' may thus be thought of as the same components or at least sensor or actuator 310' is a substitute for sensor or actuator 310, and possibly vice versa. The sensors or actuators 310, 310' are representative of any sensor and/or actuator device, including sensors 218, 219 (FIG. 2). Sensors or actuators 310, 310' my be identical in function and operation, as noted; and in the example of FIG. 3, sensor or actuator 310 represents a faulty sensor, and sensor or actuator 310' represents a replacement sensor, and thus will be referred to in the following discussion as sensors with the understanding that sensor 310' replaces sensor 310 such that these components are alternatively connected to the power system, only one at a time, rather than both being connected simultaneously.

As introduced above, the sensors 310, 310' may be smart sensors with built-in processing, memory, and interface resources (generally represented by processing logic 312, 312') to perform predefined functions. As an example, the sensors 310, 310' are configured to provide a signal indicative of particular parameter, such as NOx concentration. The sensors 310, 310' may also be assigned or otherwise associated with an alphanumeric identifier (e.g., a serial number) 314, 314' that represents the make, model, version, and/or location of the sensor within the work vehicle 100. Despite the sensors 310, 310' being identical in this example, the sensors 310, 310' have unique identifiers 314, 314' by which they may be differentiated.

Initially, the maintenance management system 300 may communicate with the sensor 310 by requesting the identifier 314. In response, the sensor 310 is configured to respond with the requested identifier 314. The maintenance management system 300 may store a copy of the identifier 314 as being associated with the sensor 310. In some instances, the identifier 314 may be provided to the maintenance management system 300 by a technician or operator.

During operation, the maintenance management system 300 may monitor the health or other diagnostic information associated with the sensor 310. For example, the maintenance management system 300 may perform diagnostic tests on the sensor 310; monitor other signals that may indicate an issue with the sensor 310 (e.g., measurements substantially out of range); or simply request and/or monitor signals that indicate that the sensor 310 is still operational and active.

The maintenance management system 300 may compare the responses and/or other information from the sensor 310 to stored expected values. If the responses are inconsistent with the expected values or the maintenance management system 300 otherwise identifies a fault with the sensor 310, the maintenance management system 300 may generate a fault (or trouble) code. Any suitable diagnostic or health management logic may be utilized to implement this function.

The fault code may be communicated to the operator, e.g., in the form of a warning light or fault code message displayed on the operator interface 254. In some cases, the maintenance management system 300 may also implement responses to the fault code, such as the imposition of an inducement on the power system 160. For example, the inducement may require a limit on power or speed of the engine 206, e.g., to avoid potentially problematic operation until the fault code is addressed. Generally, the fault code indicates to the operator that the faulty sensor 310 should be replaced or serviced by the operator or technician.

In one example, the maintenance management system 300 continues to monitor signals from the sensor 310, including monitoring for signals that represent the faulty sensor 310 has been replaced with a new sensor 310'. In other examples, the operator may affirmatively indicate to the maintenance management system 300 that the replacement sensor 310' has been installed, or the replacement sensor 310' may send a message to the maintenance management system 300 upon initialization.

Upon replacement, the maintenance management system 300 may send a message to the sensor 310' requesting the identifier. In response, the sensor 310' sends a signal representing the identifier. The maintenance management system 300 is able to confirm replacement by comparing the received identifier to the stored identifier from the previous sensor 310. The maintenance management system 300 may then clear the fault code and/or clear the inducement associated with the sensor 310. If the received identifier did not change from the stored identifier, then the maintenance management system 300 maintains the fault code and/or inducements, since the matching identifiers indicate no replacement has occurred. In effect, the maintenance management system 300 confirms that the sensor 310 that resulted in the fault code has been replaced and that the associated fault code has been addressed.

Generally, this operation occurs automatically upon replacement of the sensor 310 with sensor 310', thereby eliminating the need for a diagnostic tool or service technician to manually clear the fault codes. As a result, the maintenance management system 300 improves metrics with respect to efficiency, cost, complexity, and productivity.

In the example of FIG. 3, the subject devices are sensors 310, 310', such as NOx sensors 218, 219. However, in other examples, the subject devices may be other types of sensor or actuator devices, particularly any type of device that may communicate information regarding an associated identifier.

Figure 4:
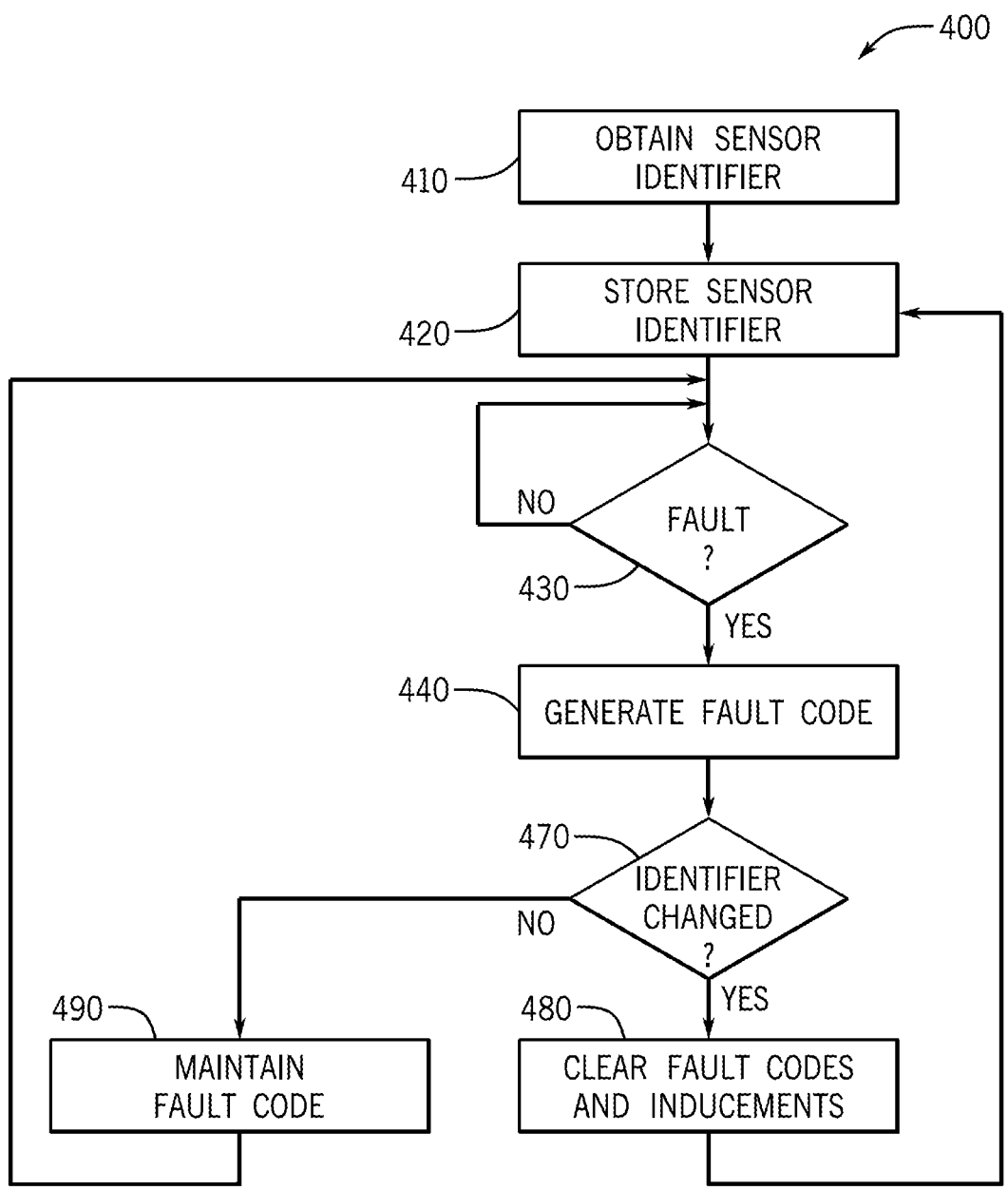
FIG. 4 is a method for maintenance management in accordance with an example embodiment.

In some examples, the maintenance management system 300 may be implemented as a method 400, such as depicted in the flow chart of FIG. 4. In a first step 410, the maintenance management system 300 obtains the alphanumeric identifier from the sensor. In step 420, the maintenance management system 300 stores the alphanumeric identifier in memory. In step 430, the maintenance management system 300 determines if the sensor is subject to a fault or other type of malfunction. If the sensor is not subject to a fault, the maintenance management system 300 continues to monitor the sensor. If the sensor is subject to a fault, the maintenance management system 300 proceeds to step 440 and generates a fault code and/or inducement. In some examples, the steps 430, 440 may be performed by a separate system, such as health monitoring or diagnostics system.

Upon replacement, the method 400 proceeds to step 470, where it may first query and obtain the identifier from the replacement sensor, for example, by the controller querying the same network address where sensor 310 was previously connected. The maintenance management system 300 then compares the identifier from the replacement sensor to the identifier from the previous sensor and sees that the identifier changed. The method 400 proceeds to step 480 and the maintenance management system 300 clears the fault codes and/or inducements. Upon clearance in step 480, the maintenance management system 300 returns to step 420 to store the updated sensor identifier for the replacement sensor before monitoring the replacement sensor for any faults. If the received identifier were to match the stored identifier, the system would confirm that no replacement had taken place. The method 400 proceeds to step 490 and the maintenance management system 300 maintains the fault codes and/or inducements and continues to monitor the original or current (non-replaced) sensor.

Accordingly, the maintenance management system enables automatic evaluation of the replacement of a sensor or actuator device based on a device identifier; and upon confirmation that the sensor or actuator device has been replaced, the clearance of any fault codes or inducement associated with the formerly installed (since replaced) sensor or actuator device. This provides a mechanism for efficiently maintaining the sensor or actuator devices of the work vehicle power systems. In particular, the disclosed systems and methods enable an operator or owner to replace faulty sensor or actuator devices without requiring a service technician to manually clear fault codes and inducements with a service tool. Moreover, this technique does not require prolonged or excessive operation of the power system, for example, in a situation in which the sensor or actuator device otherwise requires a certain elevated temperature for activation and operation. In other words, the maintenance management system and method may enable the confirmation of replacement based on identifier rather than further diagnostic tests during operation. As a result, the maintenance management systems and methods provide overall improvements with respect to efficiency, cost, complexity, and productivity.

Also, the following examples are provided, which are numbered for easier reference.

1. A power system for a work vehicle, including: an engine that generates exhaust gas; an exhaust treatment system that receives and treats the exhaust gas prior to expelling the treated exhaust gas; and an electronic control system coupled to the engine and the exhaust treatment system and implementing a maintenance management system, the maintenance management system configured to: receive a first identifier associated with a first sensor or actuator device installed in the exhaust treatment system; store the first identifier associated with the first sensor or actuator device; receive a second identifier associated with a second sensor or actuator device installed in the power system of the work vehicle; compare the first identifier to the second identifier to determine that the first identifier differs from the second identifier and that the second sensor or actuator device is a replacement for the first sensor or actuator device in the exhaust treatment system; and clearings any fault codes associated with the first sensor or actuator device.

2. The power system of example 1, wherein the maintenance management system is further configured to generate, prior to receiving the first identifier, a request for the first sensor or actuator device that requests the first identifier.

3. The power system for a work vehicle of example 1, wherein the maintenance management system is further configured to generate, prior to receiving the second identifier, a request for the second sensor or actuator device that requests the second identifier.

4. The power system of example 1, wherein the maintenance management system is further configured to monitor, prior to receiving the second identifier, signals from the first sensor or actuator device for a first fault associated with the first sensor or actuator device; and generate, upon identifying the first fault based on the monitored signals, a first fault code associated with the first sensor or actuator device.

5. The power system of example 4, wherein the maintenance management system is further configured to provide, upon generating the first fault code, a message for an operator identifying the first fault code.

6. The power system of example 5, wherein the maintenance management system is further configured to impose, upon generating the first fault code, a first inducement on the power system based on first fault code.

7. The power system of example 6, wherein the maintenance management system is further configured to clear, upon determining that the first identifier differs from the second identifier, the first inducement for the power system.

8. The power system of example 1, wherein the first sensor or actuator device is a first NOx sensor.

9. The power system of example 8, wherein the exhaust treatment system includes a diesel oxidation catalyst (DOC), a diesel particulate filter (DPF), and a selective catalytic reduction (SCR) system, wherein the selective catalytic reduction (SCR) system is downstream of the diesel oxidation catalyst (DOC) and the diesel particulate filter (DPF), and the diesel particulate filter (DPF) is downstream of the diesel oxidation catalyst (DOC), and wherein the first NOx sensor is positioned immediately downstream of the diesel particulate filter (DPF).

10. The power system of example 8, wherein the exhaust treatment system includes a diesel oxidation catalyst (DOC), a diesel particulate filter (DPF), and a selective catalytic reduction (SCR) system, wherein the selective catalytic reduction (SCR) system is downstream of the diesel oxidation catalyst (DOC) and the diesel particulate filter (DPF), and the diesel particulate filter (DPF) is downstream of the diesel oxidation catalyst (DOC), and wherein the first NOx sensor is positioned immediately downstream of the selective catalytic reduction (SCR) system.

11. A method for managing maintenance for a power system in a work vehicle with an engine and an exhaust treatment system, the method including: receiving a first identifier associated with a first sensor or actuator device installed in the power system of the work vehicle; storing the first identifier associated with the first sensor or actuator device; receiving a second identifier associated with a second sensor or actuator device installed in the power system of the work vehicle; comparing the first identifier to the second identifier to determine that the first identifier differs from the second identifier and that the second sensor or actuator device is a replacement for the first sensor or actuator device in the power system of the work vehicle; and clearing any fault code associated with the first sensor or actuator device.

12. The method of example 11, wherein, when executing the computer-executable code, the maintenance management system generates, prior to receiving the first identifier, a request for the first sensor or actuator device that requests the first identifier.

13. The method of example 11, wherein, when executing the computer-executable code, the maintenance management system generates, prior to receiving the first identifier, a request to the second sensor or actuator device that requests the second identifier.

14. The method of example 11, wherein, when executing the computer-executable code, the maintenance management system monitors, prior to receiving the second identifier, signals from the first sensor or actuator device for a first fault associated with the first sensor or actuator device; and generates, upon identifying the first fault based on the monitored signals, a first fault code associated with the first sensor or actuator device.

15. A maintenance management system implemented in an electronic control system of a work vehicle with a power system having an engine and an exhaust treatment system, the maintenance management system including: a processor; and a computer-readable storage medium storing a computer-executable code that, when executed by the processor, causes the maintenance management system to perform the operations of: receiving a first identifier associated with a first sensor installed in the exhaust treatment system; storing the first identifier associated with the first sensor; monitoring signals from the first sensor for a first fault associated with the first sensor; generating, upon identifying the first fault based on the monitored signals, a first fault code associated with the first sensor; providing, upon generating the first fault code, a message for an operator identifying the first fault code; imposing, upon generating the first fault code, a first inducement on the power system based on first fault code; receiving a second identifier associated with a second sensor installed in the exhaust treatment system; comparing the first identifier to the second identifier to determine that the first identifier differs from the second identifier and that the second sensor or actuator device is a replacement for the first sensor in the exhaust treatment system; and clearing the first fault code and the first inducement associated with the first sensor.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power system for a work vehicle, comprising:
    an engine that generates exhaust gas;
    an exhaust treatment system that receives and treats the exhaust gas prior to expelling the treated exhaust gas; and
    an electronic control system coupled to the engine and the exhaust treatment system and implementing a maintenance management system,
    the maintenance management system configured to:
        receive a first identifier associated with a first sensor or actuator device installed in the exhaust treatment system;
        store the first identifier associated with the first sensor or actuator device;
        receive a second identifier associated with a second sensor or actuator device installed in the exhaust treatment system;
        compare the first identifier to the second identifier to determine that the first identifier differs from the second identifier and that the second sensor or actuator device is a replacement for the first sensor or actuator device in the exhaust treatment system; and
        clear any fault codes associated with the first sensor or actuator device when the comparison determines that the first identifier differs from the second identifier to reflect that the second sensor or actuator device is the replacement for the first sensor or actuator device.

2. The power system of claim 1, wherein the maintenance management system is further configured to generate, prior to receiving the first identifier, a request for the first sensor or actuator device that requests the first identifier.

3. The power system for a work vehicle of claim 1, wherein the maintenance management system is further configured to generate, prior to receiving the second identifier, a request for the second sensor or actuator device that requests the second identifier.

4. The power system of claim 1,
    wherein the maintenance management system is further configured to monitor, prior to receiving the second identifier, signals from the first sensor or actuator device for a first fault associated with the first sensor or actuator device; and generate, upon identifying the first fault based on the monitored signals, a first fault code associated with the first sensor or actuator device, and
    wherein the maintenance management system is further configured to receive, prior to receiving the second identifier and after generating the first fault code associated with the first sensor or actuator device, an indication that the first sensor or actuator device has been replaced, and in response, is configured to request the second identifier from the second sensor or actuator device.

5. The power system of claim 4, wherein the maintenance management system is further configured to provide, upon generating the first fault code, a message for an operator identifying the first fault code.

6. The power system of claim 5, wherein the maintenance management system is further configured to impose, upon generating the first fault code, a first inducement on the power system based on first fault code.

7. The power system of claim 6, wherein the maintenance management system is further configured to clear, upon determining that the first identifier differs from the second identifier, the first inducement for the power system.

8. The power system of claim 1, wherein the first sensor or actuator device is a first NOx sensor.

9. The power system of claim 8, wherein the exhaust treatment system comprises a diesel oxidation catalyst (DOC), a diesel particulate filter (DPF), and a selective catalytic reduction (SCR) system,
    wherein the selective catalytic reduction (SCR) system is downstream of the diesel oxidation catalyst (DOC) and the diesel particulate filter (DPF), and the diesel particulate filter (DPF) is downstream of the diesel oxidation catalyst (DOC), and
    wherein the first NOx sensor is positioned immediately downstream of the diesel particulate filter (DPF).

10. The power system of claim 8, wherein the exhaust treatment system comprises a diesel oxidation catalyst (DOC), a diesel particulate filter (DPF), and a selective catalytic reduction (SCR) system,
    wherein the selective catalytic reduction (SCR) system is downstream of the diesel oxidation catalyst (DOC) and the diesel particulate filter (DPF), and the diesel particulate filter (DPF) is downstream of the diesel oxidation catalyst (DOC), and
    wherein the first NOx sensor is positioned immediately downstream of the selective catalytic reduction (SCR) system.

11. A method for managing maintenance for a power system in a work vehicle with an engine and an exhaust treatment system, the method comprising:
    receiving, at one or more controllers, a first identifier associated with a first sensor or actuator device installed in the power system of the work vehicle;
    storing, by the one or more controllers, the first identifier associated with the first sensor or actuator device in a memory location;
    receiving, by the one or more controllers, a second identifier associated with a second sensor or actuator device installed in the power system of the work vehicle;
    comparing the first identifier to the second identifier to determine that the first identifier differs from the second identifier and that the second sensor or actuator device is a replacement for the first sensor or actuator device in the power system of the work vehicle; and
    clearing any fault code associated with the first sensor or actuator device when the comparison determines that the first identifier differs from the second identifier to reflect that the second sensor or actuator device is the replacement for the first sensor or actuator device.

12. The method of claim 11, further comprising generating, prior to receiving the first identifier, a request for the first sensor or actuator device that requests the first identifier.

13. The method of claim 11, wherein further comprising generating, prior to receiving the second identifier, a request to the second sensor or actuator device that requests the second identifier.

14. The method of claim 11, wherein further comprising monitoring, prior to receiving the second identifier, signals from the first sensor or actuator device for a first fault associated with the first sensor or actuator device; and
generates, upon identifying the first fault based on the monitored signals, a first fault code associated with the first sensor or actuator device.

15. The method of claim 14, wherein further comprising providing, upon generating the first fault code, a message for an operator identifying the first fault code.

16. The method of claim 15, wherein further comprising imposing, upon generating the first fault code, a first inducement on the power system based on first fault code.

17. The method of claim 16, wherein further comprising clearing, upon determining that the first identifier differs from the second identifier, the first inducement for the power system.

18. The method of claim 11, wherein the first sensor or actuator device is associated with the exhaust treatment system of the power system of the work vehicle.

19. The method of claim 18, wherein the first sensor or actuator device is a nitrogen oxide (NOx) sensor of the exhaust treatment system.

20. A maintenance management system implemented in an electronic control system of a work vehicle with a power system having an engine and an exhaust treatment system, the maintenance management system comprising:

a processor; and
a computer-readable storage medium storing a computer-executable code that, when executed by the processor, causes the maintenance management system to perform the operations of:
receiving a first identifier associated with a first sensor installed in the exhaust treatment system;
storing the first identifier associated with the first sensor;
monitoring signals from the first sensor for a first fault associated with the first sensor;
generating, upon identifying the first fault based on the monitored signals, a first fault code associated with the first sensor;
providing, upon generating the first fault code, a message for an operator identifying the first fault code;
imposing, upon generating the first fault code, a first inducement on the power system based on first fault code;
receiving a second identifier associated with a second sensor installed in the exhaust treatment system;
comparing the first identifier to the second identifier to determine that the first identifier differs from the second identifier and that the second sensor or actuator device is a replacement for the first sensor in the exhaust treatment system; and
clearing the first fault code and the first inducement associated with the first sensor.

\* \* \* \* \*

UNITED STATES PATENT AND TRADEMARK OFFICE
CERTIFICATE OF CORRECTION

PATENT NO. : 10,937,258 B2  
APPLICATION NO. : 16/153083  
DATED : March 2, 2021  
INVENTOR(S) : Anderson et al.

Page 1 of 1

It is certified that error appears in the above-identified patent and that said Letters Patent is hereby corrected as shown below:

In the Claims

In Column 15, Claim 13, Line 1, delete "wherein further comprising" and insert -- further comprising --, therefor.

In Column 15, Claim 14, Line 1, delete "wherein further comprising" and insert -- further comprising --, therefor.

In Column 15, Claim 15, Line 1, delete "wherein further comprising" and insert -- further comprising --, therefor.

In Column 15, Claim 16, Line 1, delete "wherein further comprising" and insert -- further comprising --, therefor.

In Column 15, Claim 17, Line 1, delete "wherein further comprising" and insert -- further comprising --, therefor.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*